United States Patent
Hwang et al.

(10) Patent No.: US 10,246,534 B2
(45) Date of Patent: *Apr. 2, 2019

(54) APPARATUS FOR PREPARING POLYBUTADIENE

(71) Applicant: LG Chem, Ltd., Seoul (KR)

(72) Inventors: Woo Sung Hwang, Daejeon (KR); Jun Seok Ko, Daejeon (KR); Hoi In Jeong, Daejeon (KR); Jong Ku Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/554,554

(22) PCT Filed: Oct. 18, 2016

(86) PCT No.: PCT/KR2016/011702
§ 371 (c)(1),
(2) Date: Aug. 30, 2017

(87) PCT Pub. No.: WO2017/069494
PCT Pub. Date: Apr. 27, 2017

(65) Prior Publication Data
US 2018/0037683 A1 Feb. 8, 2018

(30) Foreign Application Priority Data
Oct. 22, 2015 (KR) .................. 10-2015-0147418

(51) Int. Cl.
*C08F 136/06* (2006.01)
*B01J 19/18* (2006.01)
(Continued)

(52) U.S. Cl.
CPC ......... *C08F 136/06* (2013.01); *B01J 19/1856* (2013.01); *B01J 19/1862* (2013.01);
(Continued)

(58) Field of Classification Search
CPC . C08F 136/06; C08F 2/01; C08F 36/06; B01J 19/1856; B01J 19/1862;
(Continued)

(56) References Cited

U.S. PATENT DOCUMENTS

| | | |
|---|---|---|
| 4,965,327 A | 10/1990 | Stachowiak et al. |
| 5,326,855 A | 7/1994 | Kahn |

(Continued)

FOREIGN PATENT DOCUMENTS

| | | |
|---|---|---|
| JP | S43008825 A | 4/1968 |
| JP | H03153702 A | 7/1991 |

(Continued)

OTHER PUBLICATIONS

KR 20150028615 A, machine translation, EPO Espacenet. (Year: 2015).*

(Continued)

*Primary Examiner* — Josephine L Chang
(74) *Attorney, Agent, or Firm* — Lerner, David, Littenberg, Krumholz & Mentlik, LLP (57) ABSTRACT

Provided is an apparatus for preparing polybutadiene which may improve productivity by minimizing a plugging phenomenon during the preparation of polybutadiene and increasing a conversion rate.

19 Claims, 4 Drawing Sheets

(a)

(b)

(51) Int. Cl.
*C08F 2/01* (2006.01)
*C08F 36/06* (2006.01)

(52) U.S. Cl.
CPC ............... *C08F 2/01* (2013.01); *C08F 36/06* (2013.01); *B01J 2219/0004* (2013.01); *B01J 2219/00038* (2013.01); *B01J 2219/00101* (2013.01); *B01J 2219/00159* (2013.01); *B01J 2219/00247* (2013.01)

(58) Field of Classification Search
CPC .... B01J 2219/00038; B01J 2219/00101; B01J 2219/00159; B01J 2219/00247; B01J 2219/0004; B08J 2219/0004
USPC .......................................................... 526/88
See application file for complete search history.

(56) References Cited

U.S. PATENT DOCUMENTS

| | | | |
|---|---|---|---|
| 5,414,045 A | 5/1995 | Sue et al. | |
| 6,521,720 B2 * | 2/2003 | Knauf | C08F 36/04 526/329.2 |
| 6,930,146 B1 | 8/2005 | Okada et al. | |
| 2002/0107339 A1 | 8/2002 | Knauf et al. | |
| 2005/0197474 A1 | 9/2005 | Tartamella et al. | |
| 2013/0281748 A1 | 10/2013 | Cha et al. | |
| 2018/0037683 A1 | 2/2018 | Hwang et al. | |

FOREIGN PATENT DOCUMENTS

| | | |
|---|---|---|
| JP | H07233204 A | 9/1995 |
| JP | 2004522839 A | 7/2004 |
| JP | 2007526386 A | 9/2007 |
| JP | 2018511675 A | 4/2018 |
| KR | 20030072620 A | 9/2003 |
| KR | 100625135 B1 | 9/2006 |
| KR | 20130003125 A | 1/2013 |
| KR | 20150028615 A | 3/2015 |

OTHER PUBLICATIONS

Search report from International Application No. PCT/KR2016/011702, dated Feb. 15, 2017.
Search report from International Application No. PCT/KR2016/011704, dated Feb. 15, 2017.

* cited by examiner

APPARATUS FOR PREPARING POLYBUTADIENE

CROSS-REFERENCE TO RELATED APPLICATIONS

The present application is a national phase entry under 35 U.S.C. § 371 of International Application No. PCT/KR2016/011702, filed Oct. 18, 2016, published in Korean, which claims priority from Korean Patent Application No. 10-2015-0147418, filed on Oct. 22, 2015, in the Korean Intellectual Property Office, the disclosures of which are incorporated herein by reference.

TECHNICAL FIELD

The present invention relates to an apparatus for preparing polybutadiene, and more particularly, to an apparatus for preparing polybutadiene which may improve productivity by minimizing a plugging phenomenon occurred during the preparation of polybutadiene and increasing a conversion rate.

BACKGROUND ART

Polybutadiene is a polymer compound which may be obtained by polymerization of a butadiene monomer generally represented by 1,3-butadiene, wherein the polybutadiene is being used as a material of various products due to excellent abrasion resistance and flexibility as well as lightness. About 70% of the polybutadiene is used for manufacturing tires in which the abrasion resistance is important, and about 25% of the polybutadiene is used as an additive for improving mechanical strength of plastic such as polystyrene or acrylonitrile butadiene styrene (ABS). In addition, polybutadiene is also used as a coating material for electronic assemblies due to high electrical resistance, and its use may be considered to be infinite, for example, it is used for the manufacture of golf balls (core portion) or numerous elastic materials.

An apparatus or method for preparing the polybutadiene has long been recognized as a well-known technique. However, in a polymerization process for preparing polybutadiene, a heat exchange efficiency may be reduced due to a phenomenon, in which a portion of a polymer is incorporated into a condenser configured to cool a gas mixture, which is generated by polymerization heat and discharged to the top of a reactor, and deposited inside the condenser and a gas discharge pipe located between the polymerization reactor and the condenser, that is, a plugging phenomenon, and it is more likely that the plugging phenomenon may be accelerated as a flow rate of the discharged gas mixture increases.

Also, a Ziegler-Natta metal catalyst is typically used for the polymerization of polybutadiene, wherein, since activity of the catalyst is sensitively reduced due to moisture, suspension polymerization mainly using water as a heat transfer medium or emulsion polymerization mainly using water as an emulsion matrix may not be an effective synthesis method for the polymerization of polybutadiene. Thus, in order to uniformly form a polymer structure, it is required to secure a high conversion rate above a certain level in a first polymerization step, and, for this purpose, since polymerization heat generated in a first polymerization reactor is inevitably and significantly increased, the plugging phenomenon is further accelerated.

Polybutadiene is usually prepared by continuous polymerization using two or more reactors, wherein, when the polybutadiene is prepared by such a method, residence time of a reaction raw material in the polymerization reactor is increased and the conversion rate is also increased, but, since the residence time is inversely proportional to an amount of the raw material added to the reactor, there is a need to properly configure an overall environment such as the number and arrangement of the polymerization reactors.

Various apparatuses and methods for preparing polybutadiene are known, for example, Korean Patent Application Publication No. 10-2015-0028615 (method and apparatus for preparing butadiene rubber with reduced plugging) discloses that a plugging phenomenon is reduced by continuous polymerization using two polymerization reactors, and Korean Patent Application Laid-open Publication No. 10-2013-0003125 (method of preparing 1,3-butadiene using parallel reactor) discloses that two polymerization reactors are configured in parallel so that a catalyst varies depending on raw materials supplied differently, and diverse research for further improving these apparatuses and methods has been conducted.

DISCLOSURE OF THE INVENTION

Technical Problem

The present invention provides an apparatus for preparing polybutadiene which may improve productivity by minimizing a plugging phenomenon occurred during the preparation of polybutadiene and increasing a conversion rate.

Technical Solution

According to an aspect of the present invention, there is provided an apparatus for preparing polybutadiene including: two first polymerization reactors arranged in parallel to reduce a plugging phenomenon in which butadiene (reaction raw material), a polymerization catalyst, and a solvent are respectively supplied and polymerized; at least one second polymerization reactor arranged in series with the first polymerization reactors in which a first polymerization solution containing a butadiene polymer discharged from the first polymerization reactors is supplied and a butadiene polymerization reaction is performed; and one or more condensers which condense gases discharged from the first polymerization reactors and the second polymerization reactor and supply a condensate to the first polymerization reactors and/or the second polymerization reactor.

Advantageous Effects

According to an apparatus for preparing polybutadiene according to the present invention, productivity may be improved by minimizing a plugging phenomenon occurred during the preparation of polybutadiene and increasing a conversion rate.

MODE FOR CARRYING OUT THE INVENTION

Hereinafter, the present invention will be described in detail with reference to the accompanying drawings.

Figure 1:
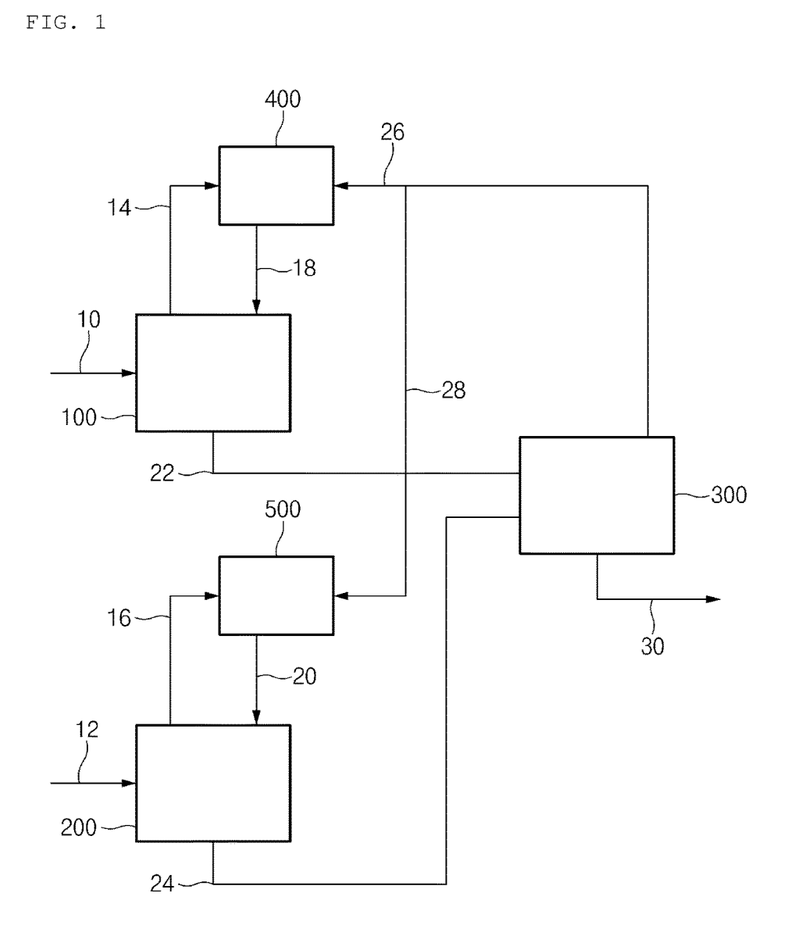
FIG. 1 is a process diagram illustrating an apparatus for preparing polybutadiene according to an embodiment of the present invention.

FIG. 1 is a process diagram illustrating an apparatus for preparing polybutadiene according to an embodiment of the present invention, wherein, as illustrated in FIG. 1, the apparatus for preparing polybutadiene according to the present invention includes: two first polymerization reactors 100 and 200 arranged in parallel to reduce a plugging phenomenon in which butadiene (reaction raw material), a polymerization catalyst, and a solvent are respectively supplied and polymerized; at least one second polymerization reactor 300 arranged in series with the first polymerization reactors 100 and 200 in which a first polymerization solution containing a butadiene polymer discharged from the first polymerization reactors 100 and 200 is supplied and a butadiene polymerization reaction is performed; and one or more condensers 400 and 500 which condense gases discharged from the first polymerization reactors 100 and 200 and the second polymerization reactor 300 and supply a condensate to the first polymerization reactors 100 and 200 and/or the second polymerization reactor 300.

Structures or shapes of the first polymerization reactors 100 and 200 and the second polymerization reactor 300 are not particularly limited, but a conventional polymerization reactor may be used and a continuous stirred-tank reactor (CSTR) or a loop reactor may be preferably used. As described above, when the first polymerization reactors 100 and 200 are configured in parallel side by side, a first polymerization reaction may be each performed by dividedly supplying a feed, such as the raw material, to each reactor, and, herein, the divided supply of the feed may denote that a portion, preferable, about a half, of an amount to be supplied to a process system composed of one first polymerization reactor is supplied to another first polymerization reactor. In contrast, as described above, the serial connection of the first polymerization reactors 100 and 200 and the second polymerization reactor 300 may denote that the polymerization solution discharged from each of the first polymerization reactors 100 and 200 is supplied to the second polymerization reactor 300, and, if a plurality of polymerization reactors is further connected to the first polymerization reactors 100 and 200 and the second polymerization reactor 300 in series, it may denote that a polymerization solution discharged from the second polymerization reactor 300 is supplied to the polymerization reactor located next to the second polymerization reactor 300.

Also, the total number of the polymerization reactors 100, 200, and 300 may vary depending on a conversion rate of a polymerization solution containing a butadiene polymer which is discharged from the final polymerization reactor located at the end, wherein as many polymer reactors as necessary to achieve a targeted conversion rate, for example, 90% or more, 95% or more, and 98% or more, may be further arranged, and the conversion rate may be more improved by further connecting a polymerization reactor serially connected to the first polymerization reactors 100 and 200. Thus, the total number of the polymerization reactors somewhat varies depending on the targeted conversion rate, but is 3 to 5, may be 3 to 4, and, for example, may be 3, consisting of the two first polymerization reactors 100 and 200 configured in parallel and the one second polymerization reactor 300 serially connected thereto.

The catalyst, which is used in the polymerization reaction by being supplied to the first polymerization reactors 100 and 200 through raw material supply pipes 10 and 12, is a Ziegler-Natta catalyst, wherein examples of the catalyst may be a transition metal compound, a lanthanide compound, an organoaluminum compound, or a mixture thereof. Also, the solvent, which is also supplied to the first polymerization reactors 100 and 200 through the raw material supply pipes 10 and 12 and used in the polymerization reaction, is an aliphatic hydrocarbon having 4 to 6 carbon atoms, a cycloaliphatic hydrocarbon, an aromatic hydrocarbon, or a mixture thereof, wherein examples of the aliphatic hydrocarbon may be butane, pentane, hexane, isopentane, heptane, octane, and isooctane, examples of the cycloaliphatic hydrocarbon may be cyclopentane, methylcyclopentane, cyclohexane, methylcyclohexane, and ethylcyclohexane, and examples of the aromatic hydrocarbon may be benzene, toluene, ethyl benzene, and xylene. Among these materials, pentane, hexane, heptane, cyclohexane, methylcyclohexane, benzene, and toluene may be used, may for example be used in a state in which water and oxygen are removed therefrom, and, for this purpose, may be used after distillation and drying. In addition to the butadiene (reaction raw material), the catalyst, and the solvent, a conventional chain transfer agent, a reaction terminator, an antioxidant, a dispersant, a lubricant, and a mixture thereof may be further supplied to the first polymerization reactors 100 and 200, if necessary.

Gas discharge pipes 14, 16, 26, and 28, which supply gas generated by polymerization heat to the condensers, are connected to tops of the polymerization reactors 100, 200, and 300, and polymerization solution discharge pipes 22, 24, and 30 (22 and 24: first polymerization solution discharge pipe, 30: second polymerization solution discharge pipe), which discharge the polymerization solution containing a butadiene polymer or supply the polymerization solution to a next polymerization reactor, are connected to bottoms of the polymerization reactors 100, 200, and 300.

Polymerization reactions performed in the first polymerization reactors 100 and 200 and the second polymerization reactor 300 may be performed at a temperature of 70° C. to 120° C., for example, 80° C. to 110° C., and a pressure of 0.1 kgf/cm$^2$ to 5 kgf/cm$^2$, for example, 1.5 kgf/cm$^2$ to 3 kgf/cm$^2$. Also, the polymerization reaction performed in the second polymerization reactor 300 may be performed at a temperature that is about 5° C. to about 10° C. higher than that of the polymerization reaction performed in the first polymerization reactors 100 and 200, wherein a temperature rise in this case is not only possible by the polymerization heat without external heat supply, but is also advantageous in terms of energy saving because heat supply is required anyway in a stripping process as a post-process. However, as described above, the temperature of the polymerization reaction performed in the second polymerization reactor 300 is generally about 5° C. to about 10° C. higher than the temperature of the polymerization reaction performed in the first polymerization reactors 100 and 200, but the temperature of the polymerization reaction performed in the second polymerization reactor 300 may vary depending on physical property requirements, for example, a polymer having a narrow molecular weight distribution (MWD) may generally be obtained as the polymerization temperature becomes lower. In the polymerization reaction, a feedstock (reaction raw material) may be preheated to control the temperature, but, since an internal temperature of the polymerization reactor may be increased by the polymerization heat generated during the polymerization reaction, it is desirable that a process of separately heating the raw material is performed only if necessary.

The solvent and an unreacted monomer are discharged under such temperature and pressure conditions, and a trace amount of the butadiene polymer may also be discharged. An amount of the polymer discharged with the solvent and the unreacted monomer through the gas discharge pipes 14, 16, 26, and 28 connected to the tops of the polymerization reactors is increased as the polymerization heat and an amount of the gas thus generated are increased, and this eventually increases an occurrence frequency of the plugging phenomenon, which prevents gas flow in the gas discharge pipes 14, 16, 26, and 28 and the condenser, to reduce a production yield of the polybutadiene.

In order to prevent or minimize the plugging phenomenon, the first polymerization reactors 100 and 200 are configured in parallel in the present invention, wherein this is for securing the long residence time of the polymerization solution by reducing a feedstock flow rate to the first polymerization reactors 100 and 200 to achieve a high conversion rate in a first polymerization step (step of performing polymerization in the first polymerization reactors 100 and 200) while reducing the amount of the discharged gas as a cause of the plugging phenomenon.

Since the conversion rate is less than 15% after a second polymerization step (step of performing polymerization in the second polymerization reactor 300), the polymerization heat is relatively small, and, accordingly, the amount of the discharged gas is small. Thus, the plugging phenomenon may be minimized only by the single second polymerization reactor 300. Also, the condensate, in which the gas discharged from the second polymerization reactor 300 is condensed, is separately supplied to the first polymerization reactors 100 and 200 (see 26 and 28 of FIG. 1) to contribute the reduction of the amount of the gas generated from the first polymerization reactors 100 and 200.

In the present invention, the conversion rate of the polymerization reaction may be adjusted by the residence time of the polymerization solution in the reactor, wherein, in order to increase the conversion rate into the butadiene polymer, the longer residence time of the feedstock in the parallel-arranged first polymerization reactors 100 and 200 may be secured (the residence time may be increased). The residence time is determined by a bulk volume of the polymerization solution in the reactor (volume occupied by the polymerization solution in the reactor) and a flow rate of the reaction raw material supplied to the reactor, and may be represented by a relationship such as Equation 1 below.

$$\text{Residence time (hr)} = \text{bulk volume (m}^3\text{)/raw material feed flow rate (kg/hr)} \times \text{density of polymerization solution (kg/m}^3\text{)} \quad \text{[Equation 1]}$$

Thus, in order to increase the residence time, the bulk volume of the reactor may be increased or the flow rate of the raw material supplied to the reactor may be decreased, but, since the polymerization heat is also increased when the bulk volume of the reactor is increased, the amount of the discharged gas may be eventually increased to accelerate the plugging phenomenon. Therefore, it is stable and desirable to increase the residence time by reducing the flow rate of the raw material supplied to the reactor. Herein, the raw material flow rate is reduced because the raw material is separately supplied to the parallel-arranged first polymerization reactors 100 and 200.

In the present invention, the two first polymerization reactors 100 and 200 are arranged in parallel so that the amount of the polymer discharged through the gas discharge pipes 14, 16, 26, and 28, which becomes the cause of the plugging phenomenon, may be reduced by increasing the residence time while inducing the conversion rate into the butadiene polymer in the first polymerization step (step of performing polymerization of butadiene in the first polymerization reactors 100 and 200) to be 85% or more, for example, 90% or more. As a result, the polymerization heat may be dispersed and, simultaneously, a high conversion rate may be secured. In addition, since the amount of the gas generated may be reduced by the dispersion of the polymerization heat, the occurrence frequency of the plugging may be reduced and a cleaning cycle of the apparatus for preparing polybutadiene may also be increased.

Thus, in the present invention, it is appropriate to allow the residence time in the first polymerization reactors 100 and 200 to be in a range of 35 minutes to 65 minutes, for example, 45 minutes to 55 minutes by adjusting the flow rates of the feedstocks such as the butadiene monomer (reaction raw material), the catalyst, and the solvent. In a case in which the residence time is less than 35 minutes, since the conversion rate in the first polymerization step is low, there is a concern that uniformity of a polymer structure may not only be reduced, but the plugging phenomenon due to the second polymerization reactor 300 may also occur while the conversion rate in the second polymerization step is relatively increased to rapidly increase the amount of the gas discharged from the second polymerization reactor 300. Also, in a case in which the residence time is greater than 65 minutes, since it means that the flow rates of the total feedstocks are significantly reduced, there is a concern that production efficiency may be reduced.

Figure 2:
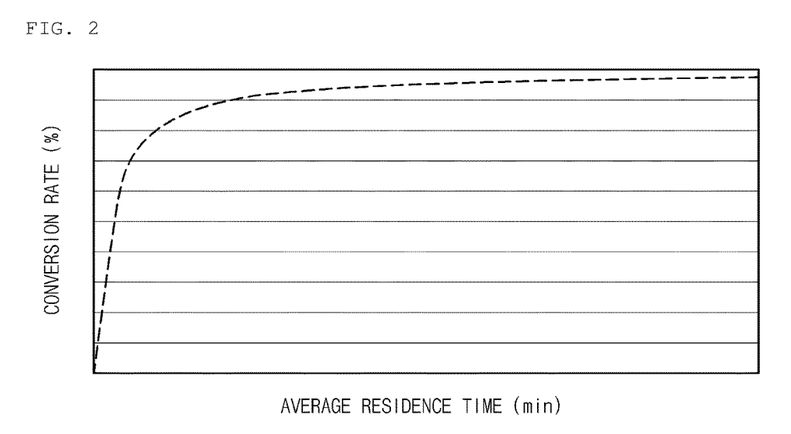
FIG. 2 is a graph showing a conversion rate of butadiene according to residence time.

FIG. 2 a graph showing the conversion rate of butadiene according to the residence time. As illustrated in FIG. 2, the conversion rate of butadiene is very rapidly increased at an initial stage of the reaction, but the increase becomes smaller over time (for example, in order for the conversion rate to reach 90%, it takes twice as much time as the time required for the conversion rate to reach 80%), and, the reason for this is that, when the amount of the butadiene monomer in the reactor is large, the polymerization heat has to be significantly increased even if the residence time is short.

In addition, the bulk volume in the first polymerization reactors 100 and 200 for minimizing the plugging phenomenon may be in a range of 30% to 70%, for example, 40% to 60%, wherein, in a case in which the bulk volume is less than 30%, there is a concern that the production efficiency may be further reduced, and, in a case in which the bulk volume is greater than 70%, there is a concern that the plugging phenomenon may be accelerated.

As described above, when the polybutadiene is prepared by using the apparatus for preparing polybutadiene according to the present invention, the amount of the gas generated in the first polymerization step (in other words, the amount of the gas generated in the first polymerization reactors 100 and 200) may be reduced by 30 wt % to 50 wt % in comparison to a method in which all polymerization reactors are configured in series, and a raw material, such as butadiene (reaction raw material), catalyst, and solvent, is then supplied to a first polymerization reactor. In addition, since the plugging phenomenon is suppressed by reducing the amount of the gas generated in the first polymerization step, the cleaning cycle of the apparatus for preparing polybutadiene is increased by 3 times or more, particularly 2.5 times or more, and more particularly 2 times or more in comparison to a conventional case.

Figure 3:
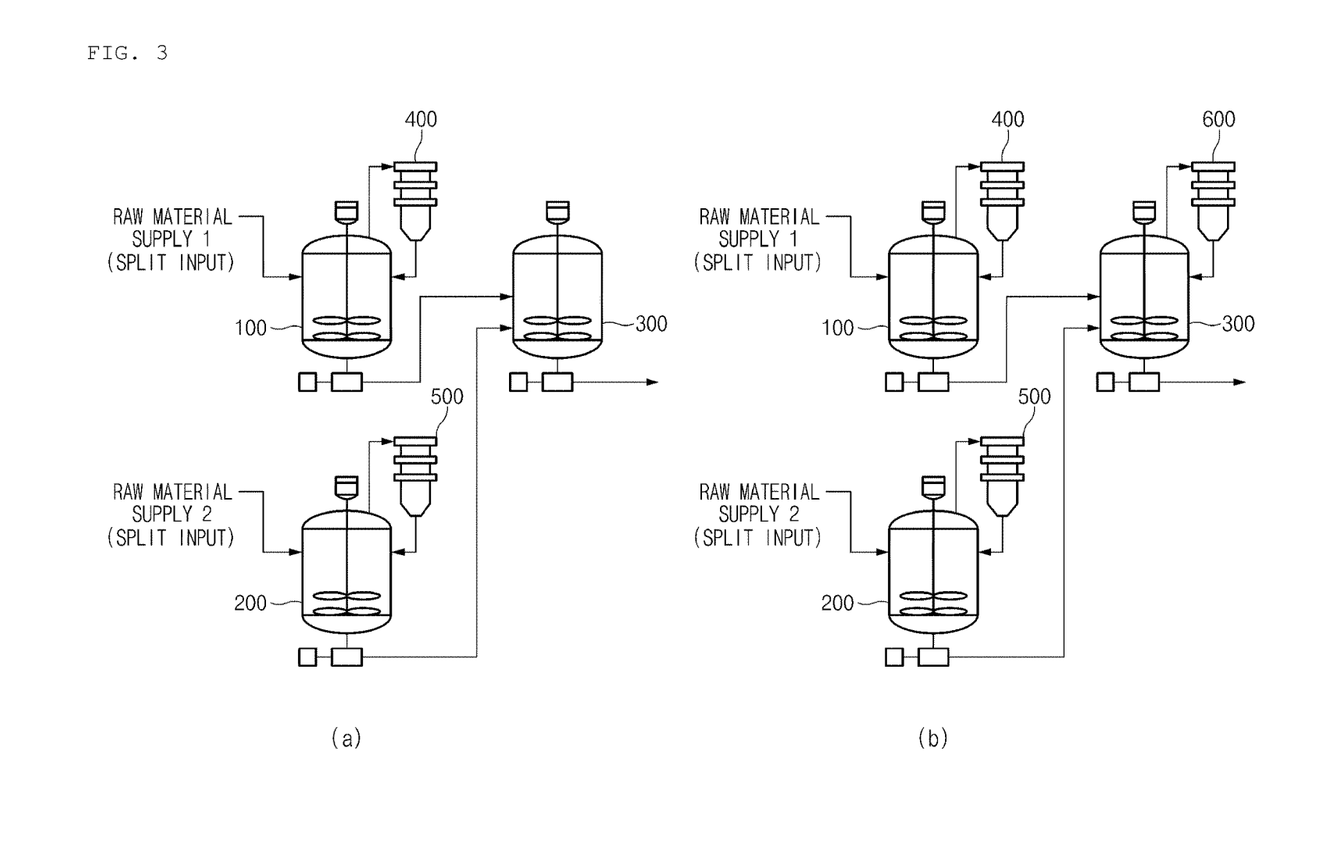
FIG. 3A is a schematic view illustrating a process of preparing polybutadiene according to an embodiment of the present invention.
FIG. 3B is a schematic view illustrating a process of preparing polybutadiene according to another embodiment of the present invention.

FIG. 3A is a schematic view illustrating a process of preparing polybutadiene according to an embodiment of the present invention, and FIG. 3B is a schematic view illustrating a process of preparing polybutadiene according to another embodiment of the present invention. The condensers 400 and 500 play a role in supplying (or refluxing) the condensate to the first polymerization reactors 100 and 200 through the circulation pipes 18 and 20 after condensing the gases discharged from the gas discharge pipes 14 and 16 connected to the first polymerization reactors 100 and 200 and the gas discharge pipes 26 and 28 connected to the second polymerization reactor 300, wherein a conventional condenser used in a polymerization reaction may be used, and, as illustrated in FIG. 1, a configuration with two condensers is desirable, but the number of the condensers is not particularly limited, for example, only one condenser may be used, or three or more condensers may be used. However, with respect to the condenser, since there is a limit capacity in which a condensed reflux liquid may be treated, the number of the condensers may be determined in consideration of an amount of the condensed reflux liquid.

In FIG. 1 and the above description, the gases discharged from the first polymerization reactors 100 and 200 and the second polymerization reactor 300 are supplied to the same condensers 400 and 500, but, as illustrated in FIG. 3B, the gas discharged from the second polymerization reactor 300 may be supplied to a separately installed condenser 600. That is, the gas discharged from the second polymerization reactor 300 is not condensed in the condensers 400 and 500 connected to the first polymerization reactors 100 and 200, but is condensed in the separate condenser 600 connected only to the second polymerization reactor 300, and a condensate condensed herein is refluxed to the second polymerization reactor 300 through a circulation pipe.

In summary, when the gases discharged from the first polymerization reactors 100 and 200 and the second polymerization reactor 300 are condensed in the same condenser, the condensate condensed therefrom is supplied to the first polymerization reactors 100 and 200, and, when the gases discharged from the first polymerization reactors 100 and 200 and the second polymerization reactor 300 are condensed in different condensers connected to each reactor, the condensates condensed therefrom are respectively refluxed to the first polymerization reactors 100 and 200 and the second polymerization reactor 300.

Hereinafter, although preferred examples are provided to allow for a clearer understanding of the present invention, they are mere examples of the present invention. It is obvious to those skilled in the art that various changes and modifications may be made therein without departing from the spirit and scope of the present invention, and such changes and modifications are intended to be covered by the appended claims.

EXAMPLE 1

Preparation of Polybutadiene

Two first polymerization reactors having a capacity of 50 MT were configured in parallel, wherein, in each reactor, a stirring device was included, a gas discharge pipe, through which gas generated by polymerization heat was discharged, was connected to a top of the reactor, a polymerization solution discharge pipe, through which a polymerization solution containing a butadiene polymer generated by a polymerization reaction was discharged, was connected to a bottom of the reactor, and a raw material supply pipe including butadiene, a catalyst, and a solvent was connected to a side wall, and a second polymerization reactor having the same shape as that of the first polymerization reactor, in which ends of the polymerization solution discharge pipes of the two first polymerization reactors were connected to a raw material supply pipe of a side wall of the second polymerization reactor, was connected to the first polymerization reactors in series. Also, a preparation apparatus, in which continuous polymerization may be performed, was configured in such a manner that, since two condensers were connected to gas discharge pipes of the second polymerization reactor while the condensers were respectively connected to the gas discharge pipes of the first polymerization reactors, an amount of gas generated in the second polymerization reactor was allowed to be divided by half and the divided gases were discharged to the two condensers, and condensates cooled through heat exchange in the condensers were respectively refluxed to the first polymerization reactors through circulation pipes.

1,3-butadiene (monomer) and n-hexane (solvent) recovered through a distillation purification column, in which moisture and oxygen were removed by allowing the 1,3-butadiene and the n-hexane to pass through a molecular sieve and a dryer filled with a silica gel, were supplied to the raw material supply pipes of the first polymerization reactors, and, in addition, nickel octanoate, as a main catalyst, and triisobutyl aluminum, as a co-catalyst, were supplied. That is, a monomer premix, in which the 1,3-butadiene and the n-hexane solvent were premixed to have a concentration of 60 wt %, was supplied at a rate of 10,800 kg/hr, a solution, in which the nickel octanoate, as a main catalyst, was dissolved in the n-hexane solvent in advance to have a concentration of 5.5 wt %, was supplied at a rate of 9.8 kg/hr, and a solution, in which the triisobutyl aluminum, as a co-catalyst, was dissolved in the n-hexane solvent in advance to have a concentration of 35 wt %, was supplied at a rate of 41.6 kg/hr to the raw material supply pipe of the first polymerization reactor, and, in addition, n-hexane was added such that a total flow rate became 21,700 kg/hr. The same amount of the raw material was also supplied to the other first polymerization reactor configured in parallel so that a total flow rate of the raw material mixture supplied to the two first polymerization reactors became 43,400 kg/hr.

Subsequently, a bulk volume of the first polymerization reactor was set to 50%, and a polymerization reaction was then performed at a temperature of 94° C. and a pressure of 2.2 kgf/cm$^2$. Gas, which was generated by polymerization heat while the polymerization reaction was performed in the first polymerization reactor, was discharged to the condenser through the gas discharge pipe at the top of the reactor to maintain the temperature and the pressure, and a first polymerization solution containing a butadiene polymer generated in the polymerization reaction was supplied to the second polymerization reactor through a first polymerization solution discharge pipe. In this case, a flow rate in the second polymerization reactor was allowed to be doubled by supplying the first polymerization solution from the two first polymerization reactors to the single second polymerization reactor. Also, a bulk volume of the second polymerization reactor was set to 50% to perform a polymerization reaction at a temperature of 101° C. and a pressure of 2.0 kgf/cm$^2$.

Gas, which was generated by polymerization heat while the polymerization reaction was performed in the second polymerization reactor, was discharged through the gas discharge pipe at the top of the reactor to maintain the temperature and the pressure. In this case, an amount of the discharged gas was divided by half, the divided gases were respectively discharged to the two condensers, the gases discharged from the first and second polymerization reactors to each condenser were cooled through heat exchange and liquefied into a condensate in each condenser, and the condensates were again refluxed to the first polymerization reactors through the circulation pipes. A second polymerization solution containing a butadiene polymer generated from the second polymerization reactor was transferred to a storage tank through a second polymerization solution discharge pipe.

EXAMPLE 2

Preparation of Polybutadiene

A polybutadiene was prepared by using the same preparation apparatus and method as those of Example 1 except that a preparation apparatus of Example 2 was the same as the preparation apparatus of Example 1, but the preparation apparatus of Example 2 was configured to allow a cooled condensate to be refluxed to the second polymerization reactor through the circulation pipe by installation of a separate condenser connected to the gas discharge pipe of the second polymerization reactor and cooling the gas generated in the second polymerization reactor through heat exchange in the separately installed condenser. In other words, Example 2 was performed in the same manner as in Example 1 except that gases discharged from the two first polymerization reactors and the single second polymerization reactor were respectively discharged to the condensers (total three condensers) and the condensates cooled through heat exchange in the condensers were respectively refluxed to the reactors.

COMPARATIVE EXAMPLE 1

Preparation of Polybutadiene

Figure 4:
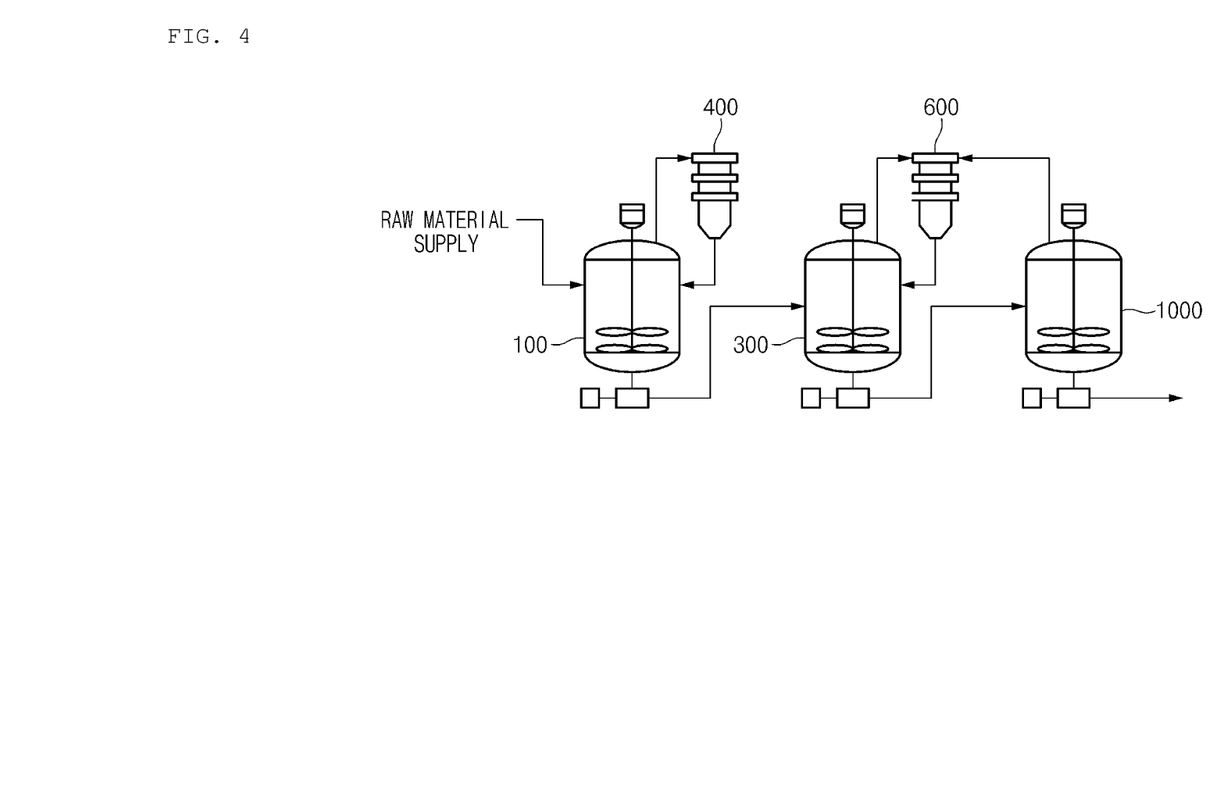
FIG. 4 is a schematic view illustrating a process of preparing polybutadiene according to Comparative Example of the present invention.

FIG. 4 is a schematic view illustrating a process of preparing polybutadiene according to Comparative Example of the present invention, wherein Comparative Example 1 was performed using the same preparation apparatus as that of Example 1 except that, as illustrated in FIG. 4, only one of the two first polymerization reactors having a capacity of 50 MT used in Example 1 was used (thus, there was only one gas discharge pipe, one polymerization solution discharge pipe, one raw material supply pipe, and one circulation pipe which were connected to the first polymerization reactor), and one third polymerization reactor (see 1000 of FIG. 4) was connected to a second polymerization reactor in series (the polymerization solution discharge pipe of the first polymerization reactor was connected), in which a gas discharge pipe was connected to a condenser (see 600 of FIG. 4) which was separately connected to the second polymerization reactor, was added.

In addition, a monomer premix, in which 1,3-butadiene and a n-hexane solvent were premixed to have a concentration of 60 wt %, was supplied at a rate of 21,600 kg/hr, a solution, in which nickel octanoate, as a main catalyst, was dissolved in the n-hexane solvent in advance to have a concentration of 5.5 wt %, was supplied at a rate of 19.6 kg/hr, and a solution, in which triisobutyl aluminum, as a co-catalyst, was dissolved in the n-hexane solvent in advance to have a concentration of 35 wt %, was supplied at a rate of 83.2 kg/hr to the raw material supply pipe of the first polymerization reactor, and, in addition, n-hexane was added such that a total flow rate became 43,400 kg/hr.

Subsequently, a bulk volume of the first polymerization reactor was set to 50%, and a polymerization reaction was then performed at a temperature of 91° C. and a pressure of 2.6 kgf/cm$^2$. Gas, which was generated by polymerization heat while the polymerization reaction was performed in the first polymerization reactor, was discharged to the condenser through the gas discharge pipe at the top of the reactor to maintain the temperature and the pressure, and a first polymerization solution containing a butadiene polymer generated in the polymerization reaction was supplied to the second polymerization reactor through a first polymerization solution discharge pipe. Continuously, a bulk volume of the second polymerization reactor was set to 50% to perform a polymerization reaction at a temperature of 100° C. and a pressure of 2.5 kgf/cm$^2$, gas, which was generated by polymerization heat while the polymerization reaction was performed in the second polymerization reactor, was discharged to the condenser through a gas discharge pipe at the top of the reactor to maintain the temperature and the pressure, and a second polymerization solution containing a butadiene polymer generated in the polymerization reaction was supplied to the third polymerization reactor through a second polymerization solution discharge pipe. Also, a bulk volume of the third polymerization reactor was set to 50% to perform a polymerization reaction at a temperature of 105° C. and a pressure of 2.3 kgf/cm$^2$, gas, which was generated by polymerization heat while the polymerization reaction was performed in the third polymerization reactor, was discharged to the condenser through the gas discharge pipe at the top of the reactor to maintain the temperature and the pressure, and a third polymerization solution containing a butadiene polymer generated by the polymerization reaction was transferred to a storage tank through a third polymerization solution discharge pipe.

COMPARATIVE EXAMPLE 2

Preparation of Polybutadiene

Comparative Example 2 was performed in the same manner as in Comparative Example 1 except that a monomer premix, in which 1,3-butadiene and a n-hexane solvent were premixed to have a concentration of 60 wt %, was supplied at a rate of 14,100 kg/hr, a solution, in which nickel octanoate, as a main catalyst, was dissolved in the n-hexane solvent in advance to have a concentration of 5.5 wt %, was supplied at a rate of 12.8 kg/hr, and a solution, in which triisobutyl aluminum, as a co-catalyst, was dissolved in the n-hexane solvent in advance to have a concentration of 35 wt %, was supplied at a rate of 54.4 kg/hr to the raw material supply pipe of the first polymerization reactor, and, in addition, n-hexane was added such that a total flow rate became 28,400 kg/hr.

EXAMPLES 1 AND 2 AND COMPARATIVE EXAMPLES 1 AND 2

Evaluation of Physical Properties of the Prepared Polybutadienes—A. Evaluation of Plugging Occurrence Cycle A flow rate of the gas discharged from the gas discharge pipe of the first polymerization reactor, a flow rate of the gas discharged from the gas discharge pipe of the second polymerization reactor, and time until a plugging phenomenon occurred, which were obtained from each of Examples 1 and 2 and Comparative Examples 1 and 2, and a flow rate of the gas discharged from the gas discharge pipe of the third polymerization reactor, which was obtained from each of Comparative Examples 1 and 2, are presented in Table 1 below. Plugging occurrence time was determined by the time until the pressure of the reactor was increased by 0.5 kgf/cm$^2$ or more in comparison to an initial pressure at the beginning of the reaction.

TABLE 1

| | Gas discharge amount from first reactor (kg/hr) | Gas discharge amount from second reactor (kg/hr) | Gas discharge amount from third reactor (kg/hr) | Plugging occurrence time (hr) |
|---|---|---|---|---|
| Example 1 | 5,825 | 1,232 | — | 1,880 |
| Example 2 | 6,650 | 816 | — | 1,590 |
| Comparative Example 1 | 11,500 | 1,989 | 295 | 480 |
| Comparative Example 2 | 6,860 | 512 | 101 | 1,520 |

As illustrate in Table 1, with respect to Examples 1 and 2 and Comparative Example 1, it may be understood that a total amount of the raw material supplied was the same, but amounts of the gases discharged from the first polymerization reactors of Examples 1 and 2 were significantly reduced in comparison to that of Comparative Example 1, and accordingly, it may be confirmed that an occurrence frequency of the plugging phenomenon was significantly reduced (particularly, since the plugging phenomenon mainly occurred in the first polymerization reactor, the occurrence frequency of the plugging phenomenon was more reduced in Example 1 than in Example 2). Also, it may be understood that amounts of the gases discharged from the second and third polymerization reactors were significantly lower than the amount of the gas discharged from the first polymerization reactor. In addition, with respect to Comparative Example 2 in which the total amount of the raw material supplied was reduced by 35%, it may be confirmed that the amount of the gas discharged from the first polymerization reactor was greater than those of Examples 1 and 2. Since the plugging may cause a significant deterioration in productivity in terms of the fact that, when the plugging occurs, it takes at least 48 hours to 96 hours to restart after cleaning, it may be considered that the above results are very meaningful.

EXAMPLES 1 AND 2 AND COMPARATIVE EXAMPLES 1 AND 2

Evaluation of Physical Properties of the Prepared Polybutadienes—B. Polymer Property Evaluation (Molecular Weight Distribution)

First reactor resistance time and conversion rate, and a total reactor residence time, a final conversion rate, and a molecular weight distribution value, which were obtained from each of Examples 1 and 2 and Comparative Examples 1 and 2, are presented in Table 2 below. The conversion rate was calculated from polymerization heat, the molecular weight distribution value was calculated after a number-average molecular weight (Mn) and a weight-average molecular weight (Mw) were obtained by gel permeation chromatography analysis to identify physical properties of the finally obtained butadiene polymer.

Herein, when describing the above gel permeation chromatography analysis, the gel permeation chromatography (GPC) analysis was conducted at a temperature of 40° C. to find out molecular weight and molecular weight distribution of the polymer, wherein, with respect to a column, two Plgel Olexis columns (product name) and one Plgel mixed-C column (product name) by Polymer Laboratories were combined, and all newly replaced columns were mixed-bed type columns. Polystyrene was used as a GPC standard material for the calculation of the molecular weight, the number-average molecular weight (Mn) and the weight-average molecular weight (Mw) were identified from analysis results, and the molecular weight distribution (Mw/Mn) was calculated from the analysis results.

TABLE 2

| | First reactor residence time (min) | First reactor conversion rate (%) | Total reactor residence time (min) | Final conversion rate (%) | Molecular weight distribution (Mw/Mn) |
|---|---|---|---|---|---|
| Example 1 | 51.4 | 90 | 77.1 | 97 | 2.0 |
| Example 2 | 51.4 | 90 | 77.1 | 97 | 2.0 |
| Comparative Example 1 | 25.7 | 80 | 77.1 | 97 | 2.5 |
| Comparative Example 2 | 39 | 87 | 117 | 98.8 | 2.2 |

As illustrate in Table 2, since the molecular weight distribution values of the butadiene polymers obtained in Examples 1 and 2 were lower than those of Comparative Examples 1 and 2 in which the first reactor conversion rates were low due to the short residence times in the first reactors, it may be understood that polymer structures of Examples 1 and 2 were more uniform. The final conversion rates of Examples 1 and 2, in which the total reactor residence times were shorter than that of the Comparative Example 2, were relatively low, but it may be confirmed that the difference therebetween was small at less than about 2%.

EXAMPLES 1 AND 2 AND COMPARATIVE EXAMPLES 1 AND 2

Evaluation of Physical Properties of the Prepared Polybutadienes—C. Production Efficiency Evaluation Polybutadiene production amounts per hour were obtained from Examples 1 and 2 and Comparative Examples 1 and 2, and the results thereof are presented in Table 3 below.

TABLE 3

| | Total raw material supply (kg/hr) | Polybutadiene production amount per hour (kg/hr) |
|---|---|---|
| Example 1 | 13,000 | 12,600 |
| Example 2 | 13,000 | 12,600 |
| Comparative Example 1 | 13,000 | 12,600 |

TABLE 3-continued

| | Total raw material supply (kg/hr) | Polybutadiene production amount per hour (kg/hr) |
|---|---|---|
| Comparative Example 2 | 8,500 | 8,400 |

With respect to Examples 1 and 2, the plugging was relatively reduced while the raw material supply amounts equal to or better than those of Comparative Examples 1 and 2 were added, and polymers having a more uniform polymer structure were prepared. Accordingly, it may be understood that their polybutadiene production amounts per hour were also excellent. Also, with respect to Comparative Example 1, since cleaning must be frequently performed due to the frequent occurrence of the plugging as confirmed in the 'A. Evaluation of Plugging Occurrence Cycle', it may be considered that production efficiency was lower than those of Examples 1 and 2 even if the polybutadiene production amount per hour was the same. In addition, as confirmed in the 'B. Polymer Property Evaluation', the physical properties of the polymer were relatively deteriorated.

The invention claimed is:

1. An apparatus for preparing polybutadiene, the apparatus comprising:
   two first polymerization reactors arranged in parallel to reduce a plugging phenomenon, wherein butadiene monomer, a polymerization catalyst, and a solvent are supplied and the butadiene monomer is polymerized;
   at least one second polymerization reactor arranged in series with the parallel-arranged two first polymerization reactors, wherein a first polymerization solution containing a butadiene polymer discharged from the parallel-arranged two first polymerization reactors is supplied and a butadiene polymerization reaction is performed; and
   one or more condensers which condense gases discharged from the parallel-arranged two first polymerization reactors and the second polymerization reactor and supply a condensate to the parallel-arranged two first polymerization reactors and/or the second polymerization reactor,
   wherein the gases discharged from the parallel-arranged two first polymerization reactors and the second polymerization reactor are condensed in different condensers connected to each reactor.

2. The apparatus for preparing polybutadiene of claim 1, wherein the polymerization reaction is performed at a temperature of 70° C. to 120° C. and a pressure of 0.1 kgf/cm$^2$ to 5 kgf/cm$^2$.

3. The apparatus for preparing polybutadiene of claim 1, wherein a conversion rate into the butadiene polymer is increased when a residence time of a feedstock in the parallel-arranged two first polymerization reactors is increased.

4. The apparatus for preparing polybutadiene of claim 3, wherein the conversion rate into the butadiene polymer is 85% or more.

5. The apparatus for preparing polybutadiene of claim 1, wherein a residence time of a feedstock in the parallel-arranged two first polymerization reactors is in a range of 35 minutes to 65 minutes.

6. The apparatus for preparing polybutadiene of claim 1, wherein a residence time of a feedstock in the parallel-arranged two first polymerization reactors is increased by increasing a bulk volume of the first polymerization solution in the parallel-arranged two first polymerization reactors or decreasing a flow rate of the feedstock supplied to the parallel-arranged two first polymerization reactors.

7. The apparatus for preparing polybutadiene of claim 6, wherein the bulk volume of the first polymerization solution in the parallel-arranged two first polymerization reactors is in a range of 30% to 70%.

8. The apparatus for preparing polybutadiene of claim 6, wherein the flow rate of the feedstock is decreased by separately supplying the feed stock to the parallel-arranged two first polymerization reactors.

9. The apparatus for preparing polybutadiene of claim 1, wherein the butadiene, the polymerization catalyst, and the solvent are supplied to the parallel-arranged two first polymerization reactors through raw material supply pipes.

10. The apparatus for preparing polybutadiene of claim 1, wherein the catalyst is a Ziegler-Natta catalyst selected from the group consisting of a transition metal compound, a lanthanide compound, an organoaluminum compound, and a mixture thereof.

11. The apparatus for preparing polybutadiene of claim 1, wherein the solvent is selected from the group consisting of an aliphatic hydrocarbon having 4 to 6 carbon atoms, a cycloaliphatic hydrocarbon, an aromatic hydrocarbon, and a mixture thereof.

12. The apparatus for preparing polybutadiene of claim 11, wherein the aliphatic hydrocarbon is selected from the group consisting of butane, pentane, hexane, isopentane, heptane, octane, and isooctane, the cycloaliphatic hydrocarbon is selected from the group consisting of cyclopentane, methylcyclopentane, cyclohexane, methylcyclohexane, and ethylcyclohexane, and the aromatic hydrocarbon is selected from the group consisting of benzene, toluene, ethyl benzene, and xylene.

13. The apparatus for preparing polybutadiene of claim 1, wherein a chain transfer agent, a reaction terminator, an antioxidant, a dispersant, a lubricant, and a mixture thereof are further supplied to the parallel-arranged two first polymerization reactors.

14. The apparatus for preparing polybutadiene of claim 1, wherein the parallel-arranged two first polymerization reactors disperse polymerization heat to reduce an amount of gas generated during the polymerization.

15. The apparatus for preparing polybutadiene of claim 1, wherein gas discharge pipes, which supply gas generated by polymerization heat to the condensers, are connected to tops of the parallel-arranged two first polymerization reactors and the second polymerization reactor, and polymerization solution discharge pipes, which discharge the polymerization solution containing the butadiene polymer or supply the polymerization solution containing the butadiene polymer to a next polymerization reactor, are connected to bottoms of the parallel-arranged two first polymerization reactors and the second polymerization reactor.

16. The apparatus for preparing polybutadiene of claim 1, wherein the condensate is supplied to the parallel-arranged two first polymerization reactors and/or the second polymerization reactor through circulation pipes.

17. The apparatus for preparing polybutadiene of claim 1, wherein, the condensate condensed therefrom is respectively refluxed to the parallel-arranged two first polymerization reactors and the second polymerization reactor.

18. The apparatus for preparing polybutadiene of claim 1, further comprising a polymerization reactor serially connected to the parallel-arranged two first polymerization reactors and the second polymerization reactor.

19. The apparatus for preparing polybutadiene of claim 1, wherein the total number of the polymerization reactors is 3 to 5.

\* \* \* \* \*